Jan. 20, 1970  H. FELD  3,490,319
HEAVY MACHINE TOOL

Filed July 21, 1967  4 Sheets-Sheet 1

INVENTOR
HEINRICH FELD
BY
Richards & Geier
ATTORNEYS

Jan. 20, 1970  H. FELD  3,490,319
HEAVY MACHINE TOOL

Filed July 21, 1967  4 Sheets-Sheet 2

INVENTOR
HEINRICH FELD
BY
Richards & Geier
ATTORNEYS

Jan. 20, 1970  H. FELD  3,490,319
HEAVY MACHINE TOOL
Filed July 21, 1967  4 Sheets-Sheet 3

INVENTOR
HEINRICH FELD
BY
Richards & Geier
ATTORNEYS

Jan. 20, 1970  H. FELD  3,490,319
HEAVY MACHINE TOOL
Filed July 21, 1967  4 Sheets-Sheet 4

INVENTOR
HEINRICH FELD
BY
Richards & Geier
ATTORNEYS 3,490,319
HEAVY MACHINE TOOL
Heinrich Feld, Kirchen (Sieg), Germany, assignor to H. A. Waldrich G.m.b.H., Siegen, Westphalia, Germany, a corporation of Germany
Filed July 21, 1967, Ser. No. 655,100
Claims priority, application Germany, July 22, 1966, W 42,063
Int. Cl. B23b 25/00, 5/28, 23/02
U.S. Cl. 82—38                                7 Claims

ABSTRACT OF THE DISCLOSURE

In a heavy machine tool, such as a lathe, the proper position of a workpiece carried upon a collar plate is adjusted relatively to the cutting tool by the use of horizontal and vertical gauges adapted to engage the workpiece and to transmit the required adjusting movements to parts of the collar plate actually supporting the workpiece.

---

This invention relates to a heavy machine tool, particularly a large lathe with an independent supporting bed. The invention is particularly concerned with a shaving removing machine tool for treating heavy workpieces weighing up to 200 tons arranged with a lying axle, especially a large lathe for treating turbine runners, generator runners or the like. The present invention is equally applicable to other similar heavy machine tools, such as grinding machines, milling machines, planing machines or the like.

There is at the present time the desire not to provide too heavy machine constructions, even if high precision work is required. This has resulted in the separation of the bed for the support or supports of such machines from the rest of the machine. This has the advantage that changes in shape resulting from the load upon the part of the bed carrying the workpiece and other stresses, particularly oscillating stresses, are not transmitted upon the support bed and thus to the cutter. Furthermore, a construction has been provided wherein not only the beds but also their respective foundations have been divided. This has the result that when the workpiece is very heavy changes take place in the height location of the workpiece axis which make it different from the location assumed during the mounting of the machine tool and maintained by the support irrespective of the loads. These conditions make precise treatment impossible.

Furthermore at the present time there is the tendency toward an ever increasing automation in the treatment of large workpieces, for example, by guiding the entire operation by perforated bands, magnetic bands, etc. This makes it necessary to maintain the absolute location of the worktool and the workpiece and to effectively maintain this location during the treating operations, since the usual supervision by the workman operating the machine cannot take place any more. An error in the initial location of the workpiece will jeopardize the success of the automatic treatment, particularly the finishing operation.

An object of the present invention is to eliminate these drawbacks of prior art constructions.

Other objects of the present invention will become apparent in the course of the following specification.

In the accomplishment of the objectives of the present invention it was found desirable to use workpiece carriers known in prior art, such as collar plates, and make them adjustable in relation to the treating level—thus in the case of a machine tool such as a large lathe, to the cutting level.

It is believed that the present invention is not only concerned with the solution of the above-stated problem, but resides already in the disclosure of this problem. While theoretically the solution can be carried out, for example, by placing optical adjusting devices in the support or in the collar plates, up to the time of the present invention the possibility of such adjustment was not recognized. The technical progress of the present invention consists in saving at least one operation. It should be noted that for large workpieces this one operation consumes a great deal of time. Furthermore, the present invention makes possible increased precision of the treatment. The present invention is also based on the further recognition that while it is easily possible to adjust the support or the height of the cutter to the new lowered level of the axis of the workpiece, the difference in the lowering of the two bearing locations of a workpiece will not be considered. For this reason the present invention follows the reverse procedure, namely, it provides for adjustment of the level of the collar plates relatively to an invariable support, particularly since it may be assumed that the location of the support path remains uninfluenced.

In accordance with the present invention a particularly simple device for the adjustment of the collar plates is provided by placing upon each support a horizontal or vertical gauge which can be set to the diameter of the workpiece, whereby the zero position of the gauge corresponds to the workpiece axis related to the support. A perpendicular plane extending through the two gauges which is intersected at a right angle by the desired workpieces axis, will provide for the gauge axis the main coordinates of the desired axis center of the workpiece. If the related mass or masses of the workpiece are measured at the controlling location and if the two gauges are set to determined controlling measures relatively to the real center of the axis in the indicated plane, then it is possible to proceed in two different ways. The following explanation uses a large lathe as an example. In the first place, the horizontal gauge can be used in its set position in such manner that it is set somewhat more toward the middle of the axis; in this position the transverse feed of the support is switched on and is switched off when the set position is reached. The switching can then be carried out in such manner that at that moment the switching off device for the support feed actuates the feed device for the central support of the collar plate and raises it until the vertical gauge of the support moves from a withdrawn low switch position for the feed device of the collar plate support into the required position and thus switches off this feed device. This switching operation can be used to release other switching operation used, for example, to clamp firmly the central support of the collar plate and to actuate the two side supports of the collar plate either by moving them with pressure and then also clamping them or by moving them to the support diameter measured at the workpiece which is set in the gauges and the setting of which can be transmitted to the side supports of the collar plate, whereupon these side supports can be also firmly clamped. When these switching operation have been completed it is possible to provide an automatic return movement of the support, to withdraw the horizontal gauge automatically and to swing out the vertical gauge automatically.

A corresponding procedure can be used when instead of a collar plate having two or three supports, a collar plate is provided which has a half shell or which has a device receiving the cage of a roller bearing or the like. In that case the above-mentioned central support of the collar plate is replaced by a central feed device and the side supports of the collar plate are replaced by adjusting devices which are preferably operated simultaneously and automatically, for example, two terminal wedge devices operating in opposite directions. If desired, all movable parts of the collar plate can be rigidly fixed after the setting has been completed.

The invention will appear more clearly from the following detailed description when taken in connection with the accompanying drawings showing by way of example, preferred embodiments of the inventive idea pertaining to a large lathe.

In the drawings.

Similar parts are indicated by the same numerals in the drawings.

Figure 1:
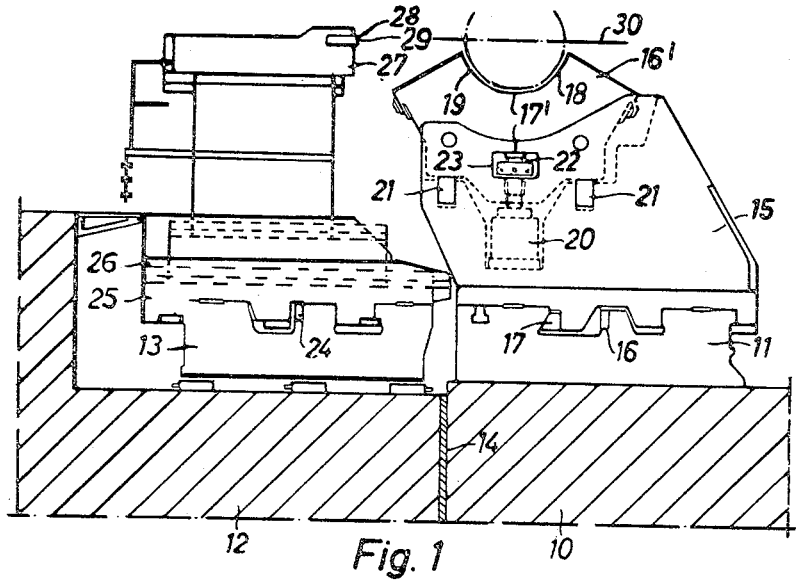
FIGURE 1 is a front view, partly in section, of a divided bed of a large lathe having a support and a collar plate, whereby the collar plate has three supports.

FIG. 1 shows a foundation 10 for the workpiece bed 11 and a foundation 12 for the support bed 13. The two foundations are separated by an adjustable spacing 14. The workpiece bed 11 carries a collar plate 15 which is movable thereon by a drive (not shown) actuating a rack 16; the collar plate can be clamped by a wedge-shaped ledge 17 and suitable holding means. The collar plate has an upper part 16' with a central support 17' and two side supports 18 and 19. A cylinder 20 shown by broken lines in FIG. 1 is provided with a hydraulic device for adjusting the collar plate part 16' upwardly in guides 21; it can be fixed by suitable means (not shown). The collar plate supports 17', 18 and 19 can be set by hand, the central support 17' being adjusted relatively to the device of cylinder 20 by a screw 22 and an annular nut 23 which then serves as a return stop.

The support 13 carries a further support base 25 upon which an upper support 26 is mounted. The supports 25 and 26 are longitudinally movable in guides upon the support 13 by means of a rack 24 and a rack drive (not shown). The support 26 is movable transversely upon the support base 25 and carries a chisel holder 27 and a chisel 28 the cutting edge 29 of which is located upon the desired level indicated by the line 30.

Figure 2:
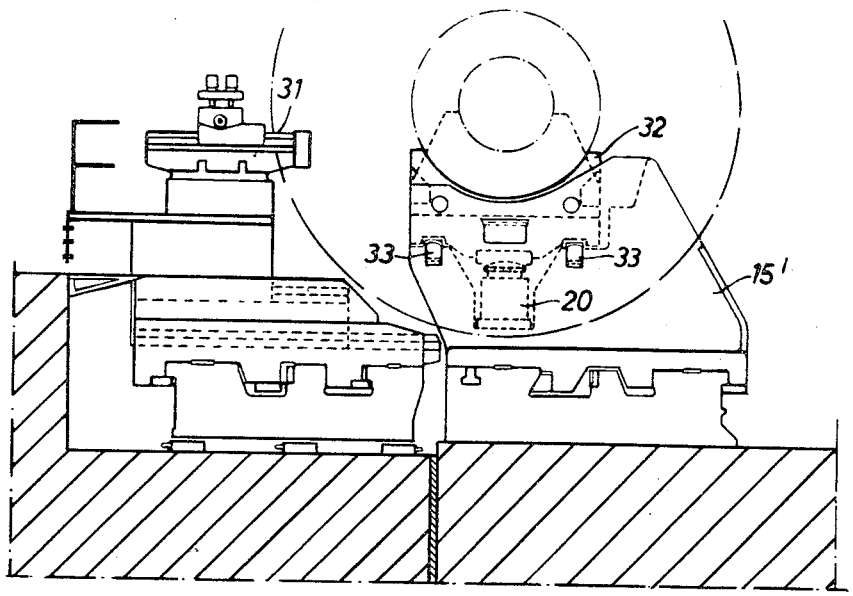
FIGURE 2 is a similar view of a lathe having a collar plate with a half shell.

FIG. 2 shows a somewhat similar construction which is provided with a cross-shaped support 31. An important distinction which concerns the present invention pertains to the shape of the collar plate. The somewhat differently constructed lower portion 15' of the collar plate carries an upper part 32 having the shape of a half shell; it is also adjustable in height by the hydraulic device 20 and can be held firmly by means which are not illustrated. The part 32 can be held rigidly and its tilting can be prevented by terminal wedge-shaped setting devices 33.

Figure 3:
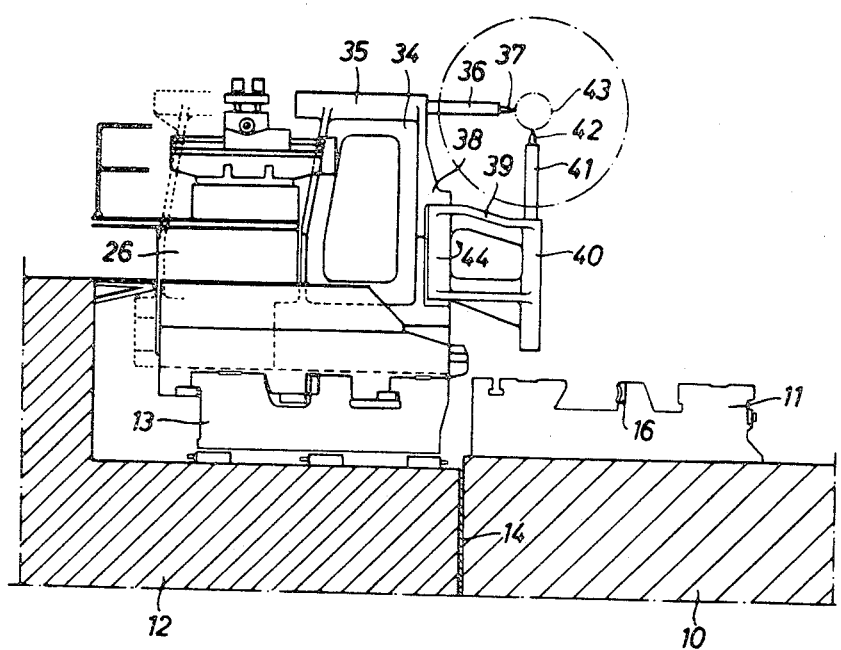
FIGURE 3 is a similar view showing the gauges in their operative positions.

FIG. 3 shows a fixing device 34 which is mounted upon the upper support 26 and which can constitute a part of the support or, preferably, which is connected thereto by screws. The device 34 has a bearing bush 35 for a horizontal gauge 36 with a gauge point 37 and a swingable support 38 carrying an arm 39 which holds a bearing bush 40 for a vertical gauge 41 having a gauge point 42.

The apparatus is provided with suitable switching means and the arrangement according to FIG. 3 is such that initially the usual measurements are made of the diameter of the roll pin being supported or of a corresponding lug specially provided for this purpose. According to the present invention this measurement is introduced into the gauges. Thus the horizontal gauge 36 is set in such manner that the gauge point 37 movable therein is brought under spring pressure into a position corresponding to a somewhat smaller diameter and then it actuates an electrical switch which—when the apparatus is switched on—switches on the support for supply movement. The vertical gauge 41 is set in a corresponding manner also to a somewhat smaller diameter, but it leaves without current a corresponding electrical switch between the gauge point 42 and the gauge 41. This switch is connected with means actuating a hydraulic pump for the feed cylinder 20 in the lower collar plate part 15' in such manner that this part is actuated to an extent corresponding to the precise set value when the gauge point 42 is pressed into the gauge 41.

As soon as the apparatus is switched on, the vertical gauge—the axis of which is located precisely on the level of the cutting edge 29 of the chisel 28 (FIG. 1)—will switch on the support for a supply movement taking place until the gauge point 37 is moved into the contact with the pin 43 of the workpiece. When the set value is reached the device switches off the movement of the support, so that the support now stands still and thus the vertical gauge 41 is now located precisely under the axis of the workpiece. The point 42 of the gauge 41 is then already pressed inwardly due to the low location of the workpiece so that the switch is actuated. Then the workpiece is raised by the hydraulic device 20 through the upper collar plate 16'. As soon as the desired position is reached, the feed movement is stopped by the movement of the gauge point 42 out of the gauge 41. Then the workpiece axis has been brought upon the collar plate to the precise cutting level. At the same time the gauge point 42 actuates a clamping device in the collar plate which rigidly holds all the parts relatively to each other. At the same time the clampings in the gauges are released, whereby the horizontal gauge 36 is withdrawn from the workpiece and the swinging arm 39 with the vertical gauge 41 is swung away in the direction of the arrow 44 (FIG. 3).

Then the support is moved longitudinally to the other supporting location, the upper support is moved to its initial position and the same operation is carried out at the other supporting location.

Figure 4:
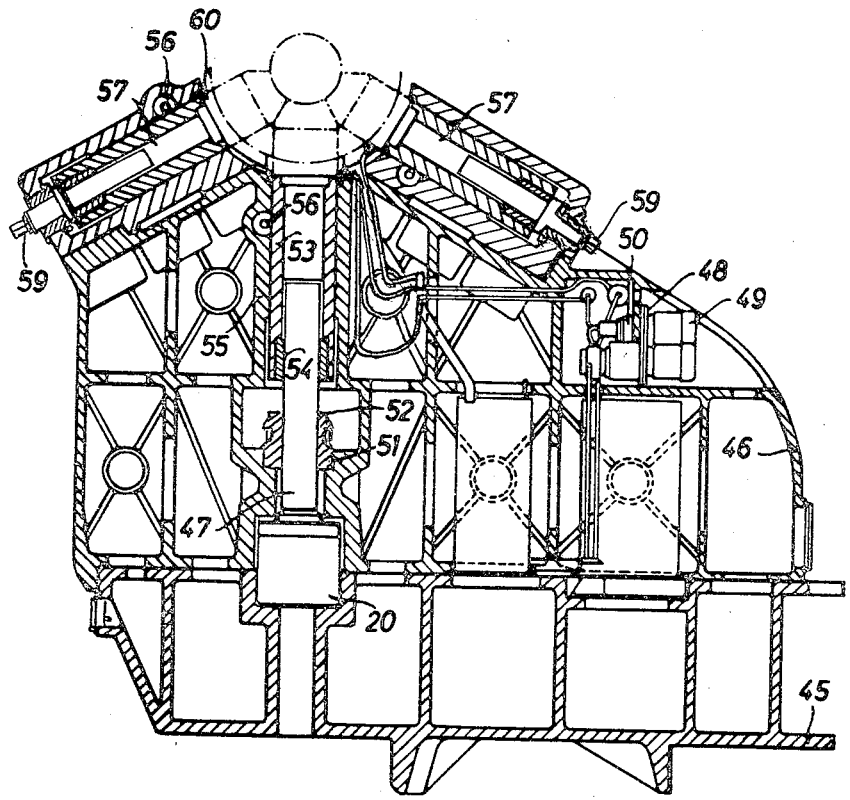
FIGURE 4 is a sectional view of a part of a construction similar to that shown in FIG. 1.

FIG. 4 shows details of a constructional embodiment. In the illustrated construction the lower part of the collar plate consists of a slide 45 and a collar plate casing 46 containing the drives. The cylinder 20 is located between them and is used to actuate a piston rod 47. A hydraulic pumping device 48 has a driving motor 49 and a pump 50 which supplies fluid under pressure to the cylinder 20. The piston rod 47 can be adjusted as to height by a ring nut 51 and a counter-nut 52.

The piston rod 47 extends into a sleeve 53 which can be adjusted relatively thereto by a threaded bush 54. The sleeve 53 moves in a tube 55 of the casing which has a slit in this location and which carries a fixing device 56 for the sleeve. The sleeve 53 actuates the central support of the collar plate.

The side supports 57 and 58 of the collar plate are adjustable manually through square heads 59 and can be fixed by suitable clamping devices 56. The heads 60 of the side supports 57 and 58 can be replaced depending upon the required diameter of the workpiece support.

Figure 5:
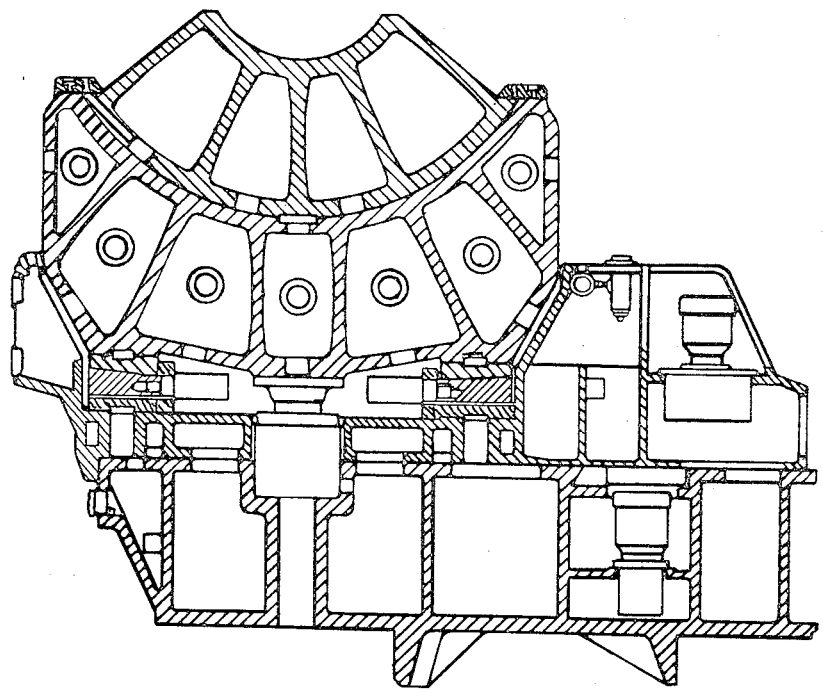
FIGURE 5 is similar to FIG. 4 but shows a part of the construction shown in FIG. 2.

FIG. 5 shows essentially the same construction as that of FIG. 4 but adapted to the construction of FIG. 4.

It is apparent that the examples described above have been given solely by way of illustration and not by way of limitation and that they are capable of many variations and modifications within the scope of the present invention. All such variations and modifications are to be included within the scope of the present invention.

What is claimed is:

1. A heavy machine tool, such as a lathe, comprising a workpiece bed, a separate support bed, a cutting tool, means carrying said cutting tool upon said support bed, workpiece supports having a collar plate, means carried by said workpiece bed and adjusting said workpiece supports relatively to said cutting tool, a horizontal gauge, a vertical gauge, said gauges being adjustable relatively to the location of a workpiece and having a zero location corresponding to a workpiece axis related to said tool, and means operatively connecting said gauges with said collar plate and the first-mentioned means.

2. A machine tool in accordance with claim 1, wherein the first-mentioned means comprise a support movable upon said support bed and wherein the last-mentioned means comprise means actuated by said horizontal gauge for moving said support and means actuated by said vertical gauge for setting the height of said collar plate.

3. A machine tool in accordance with claim 1, wherein the first-mentioned means comprise a support movable upon said support bed to a zero position corresponding to a set axis of the workpiece and wherein the last-mentioned means comprise a transverse support, means actuated by said horizontal gauge and actuating said transverse support for shifting the horizontal distance of said collar plate from the first-mentioned support and means actuated by said vertical gauge for setting the height of said collar plate.

4. A machine tool in accordance with claim 1, wherein the first-mentioned means comprise a support movable upon said support bed and wherein the last-mentioned means comprise bearing bushes carried by said support and carrying said gauges, said horizontal gauge being movable axially and said vertical gauge being swingable about an axis.

5. A machine tool in accordance with claim 4, wherein said workpiece supports comprise a collar plate having a central support and at least one other support and wherein the second-mentioned means comprise means setting said central support and fixing it.

6. A machine tool in accordance with claim 5, wherein the second-mentioned means further comprise means setting said other support relatively to the bearing diameter of the workpiece.

7. A machine tool in accordance with claim 4, wherein said collar plate has a half shell and wherein the second-mentioned means comprise a device setting the height of said half shell and two terminal adjustable setting and supporting devices located on opposite sides of the first-mentioned device.

References Cited

UNITED STATES PATENTS

| | | | |
|---|---|---|---|
| 3,281,995 | 11/1966 | Parrella et al. | 82—45 XR |
| 3,200,679 | 8/1965 | Johnson | 82—45 XR |

FOREIGN PATENTS

| | | |
|---|---|---|
| 348,568 | 2/1922 | Germany. |
| 978,434 | 12/1964 | Great Britain. |

LEONIDAS VLACHOS, Primary Examiner

U.S. Cl. X.R.

82—45, 8